US012794171B2

United States Patent

Bauer

(12) United States Patent
(10) Patent No.: US 12,794,171 B2
(45) Date of Patent: Nov. 10, 2026

(54) ELECTRIC VEHICLE HAVING A CHARGING FLAP MODULE

(71) Applicant: Dr. Ing. h.c. F. Porsche Aktiengesellschaft, Stuttgart (DE)

(72) Inventor: Riccardo Bauer, Owen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 333 days.

(21) Appl. No.: 18/600,830

(22) Filed: Mar. 11, 2024

(65) Prior Publication Data

US 2024/0339780 A1 Oct. 10, 2024

(30) Foreign Application Priority Data

Apr. 4, 2023 (DE) ..................... 10 2023 108 549.2

(51) Int. Cl.

| | |
|---|---|
| ***H01R 13/52*** | (2006.01) |
| ***B60L 53/16*** | (2019.01) |
| ***E05F 15/611*** | (2015.01) |
| ***E05F 15/655*** | (2015.01) |
| ***E05F 17/00*** | (2006.01) |

(52) U.S. Cl.

CPC .......... *H01R 13/5213* (2013.01); *B60L 53/16* (2019.02); *E05F 15/611* (2015.01); *E05F 15/655* (2015.01); *E05F 17/004* (2013.01); *E05Y 2900/534* (2013.01); *H01R 2201/26* (2013.01)

(58) Field of Classification Search

CPC ............ H01R 13/5213; H01R 2201/26; H01R 13/4536; B60L 53/16; E05F 15/611; E05F 15/655; E05F 17/004; E05Y 2900/534; E05D 15/58; Y02T 10/70; Y02T 10/7072; Y02T 90/14

See application file for complete search history.

(56) References Cited

U.S. PATENT DOCUMENTS

| | | | | |
|---|---|---|---|---|
| 9,193,270 | B2 * | 11/2015 | Tanneberger | B60L 53/00 |
| 12,662,006 | B2 * | 6/2026 | Vahle | B60L 53/16 |
| 2024/0271474 | A1 * | 8/2024 | Och | B60K 1/00 |

FOREIGN PATENT DOCUMENTS

| | | | | |
|---|---|---|---|---|
| CN | 205044832 | U | 2/2016 | |
| CN | 213026660 | U | 4/2021 | |
| CN | 113594785 | A | 11/2021 | |
| CN | 113997806 | A | 2/2022 | |
| CN | 114435161 | A | 5/2022 | |
| CN | 118369240 | A * | 7/2024 | E05B 83/28 |
| DE | 102011076927 | A1 * | 12/2012 | H01R 13/4532 |

(Continued)

*Primary Examiner* — Seung H Lee

(74) *Attorney, Agent, or Firm* — Buchanan Ingersoll & Rooney PC

(57) ABSTRACT

An electric vehicle having a charging flap module. The vehicle includes a body having a body interior, which has a body element having an outer skin. The body element has a charging port, in which the charging flap module is arranged with a charging interface. The charging flap module is configured to be fixed to the body and with a charging flap. The charging flap is configured to be movable between an open position and a closed position for opening and closing the charging port. The charging flap comprises at least two movable flap parts. The flap parts are pivotable in a storage space of the body interior receiving the charging interface.

16 Claims, 1 Drawing Sheet

(56) References Cited

FOREIGN PATENT DOCUMENTS

| | | | | |
|---|---|---|---|---|
| DE | 102021006064 | A1 * | 2/2022 | ........... H01R 13/447 |
| JP | H0428701 | U | 3/1992 | |
| JP | 2011101459 | A | 5/2011 | |

* cited by examiner

ELECTRIC VEHICLE HAVING A CHARGING FLAP MODULE

CROSS-REFERENCE TO RELATED APPLICATION

This application claims priority to German Patent Application No. 10 2023 108 549.2, filed Apr. 4, 2023, the content of such application being incorporated by reference herein in its entirety.

FIELD OF THE INVENTION

The invention relates to an electric vehicle having a charging flap module.

BACKGROUND OF THE INVENTION

Electric vehicles having charging flap modules are known. Electrical outlets that are operatively connected to an electromotive drive are formed in the charging flap modules. The electrical outlet is for connection to a plug of a charging station external to the electric vehicle for fueling the electric vehicle. During operation of the electric vehicle, the electrical outlet is closed using a charging flap of the charging flap module. The charging flap module movably comprises the charging flap. In particular, the charging flap secures a charging interface of the charging flap module from ingress of dirt and/or water.

From publication JP H0428701 U, which is incorporated by reference herein, an electric vehicle with a charging flap module is known, the charging flap of which has two shields, wherein the shields can be pivoted for opening inwardly, but not in a storage space receiving the charging interface.

From publications JP 2011101459 A and CN 205044832 U, which are incorporated by reference herein, an electric vehicle with a charging flap module is known, in which shields of the charging flap are pivoted outwardly.

A two-part charging flap of an electric vehicle is also apparent from publication CN 113594785 A which is incorporated by reference herein.

From publications CN 113997806 A and CN 114435161 A, which are incorporated by reference herein, an electric vehicle with a charging flap module is known, the charging flap of which has two outwardly pivoting flap parts that are multi-articulated.

A multi-part charging flap for an electric vehicle is referred to in publication CN 213026660 U, which is incorporated by reference herein, the flap parts of which can be moved to a concealed position.

SUMMARY OF THE INVENTION

An electric vehicle according to aspects of the invention having a charging flap module comprises a body with a body interior having a body element with an outer skin. The body element has a charging port in which the charging flap module is arranged with a charging interface, wherein the charging flap module is designed to be fixed to the body and with a charging flap. The charging flap is designed to be movable between an open position and a closed position for opening and closing the charging flap, wherein the charging flap comprises at least two movable flap parts. According to the present invention, the flap parts are pivotable in a storage space of the body interior receiving the charging interface.

In an embodiment of the electric vehicle according to aspects of the invention, the flap parts can be arranged on the left side and on the right side of the charging interface, or above and below the charging interface. In other words, in the example of two flap parts, one of the two flap parts can be arranged on the left or top and the other of the two flap parts can be arranged on the right or bottom.

In a further embodiment of the electric vehicle according to aspects of the invention, the flap parts are advantageously movable with the aid of a slotted guide. The slotted guide offers the advantage of secure and thus reliable guidance.

In a further embodiment of the electric vehicle according to aspects of the invention, oppositely designed flap parts are designed to overlap. Thus, the flap parts can not only be arranged adjacent to one another, but instead form a further protection against soiling and/or wetness due to the overlap, which is in the form of a nose, for example.

It should be noted at this point that the nose naturally extends preferably completely entirely along one edge of the flap parts, wherein the edge is formed opposite an edge of the opposite slat.

In a further embodiment of the electric vehicle according to aspects of the invention, the charging flap module is designed for arranging an outer surface of the flap parts flush with an outer skin of the electric vehicle at least in a closed position. This has the substantial advantage that even when the charging flap is opened, if operation of the charging interface is required, there is no protrusion over the outer skin, which prevents the charging flap from getting caught or snagged and thus damage to the charging flap or injury to an operator of the charging interface. If the outer surface of the flap parts is also arranged flush with the outer skin in the closed position, an advantageous design is in particular taken into account.

For simplified operation of the charging flap module, it has a drive, preferably an electric drive, to move the charging flap.

BRIEF DESCRIPTION OF THE DRAWINGS

Additional advantages, features, and details of the invention arise from the following description of preferred exemplary embodiments, as well as with reference to the drawings. The features and feature combinations specified hereinabove in the description, as well as the features and feature combinations mentioned hereinafter in the description of the drawings and/or shown alone in the drawings, can be used not only in the respectively specified combination, but also in other combinations, or on their own, without departing from the scope of the invention. Identical or functionally identical elements are assigned identical reference signs. The figures show.

DETAILED DESCRIPTION OF THE INVENTION

Figure 1:
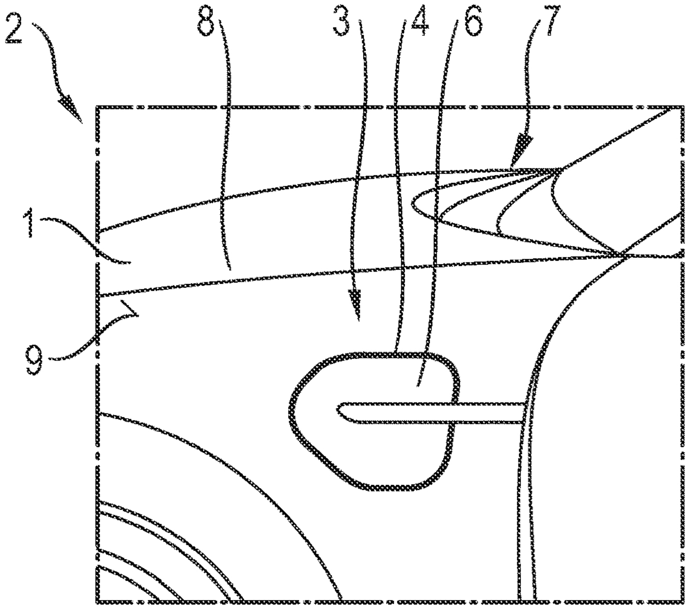
FIG. 1 is a section of a side view of a body of an electric vehicle with a charging flap module according to the prior art in a closed position.

FIG. 1 shows a section of a side view of a body 1 of an electric vehicle 2 having a traction battery, which is not shown in more detail, in a closed position of a charging flap module 3 according to the prior art. The body 1 has a charging port 4 with a charging interface 5, which is releasable or closable with the aid of a charging flap 6. The electric vehicle 2 can be designed in the form of a solely battery-powered motor vehicle, or it can be designed in the form of a so-called hybrid vehicle, which can be operated either with the aid of an internal combustion engine or an electric motor.

The body 1 is designed to include a body interior 7, and comprises a body element 8 in which the charging port 4 is introduced. In the present example embodiment, the body element 8 is designed in the form of a front side part of the body 1, although it could also be designed in the form of a rear side part or a front part or a rear part of the body 1. Accordingly, the charging flap 6 is arranged in the corresponding body element 8 comprising the charging port 4. The body element 8 comprises an outer skin 9, which is formed on the side of the body element 8 facing away from the body interior 7.

Figure 2:
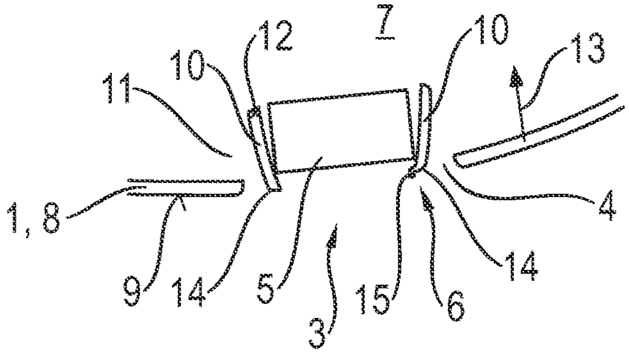
FIG. 2 is a section of a charging flap module of an electric vehicle according to aspects of the invention in an open position.
Figure 3:
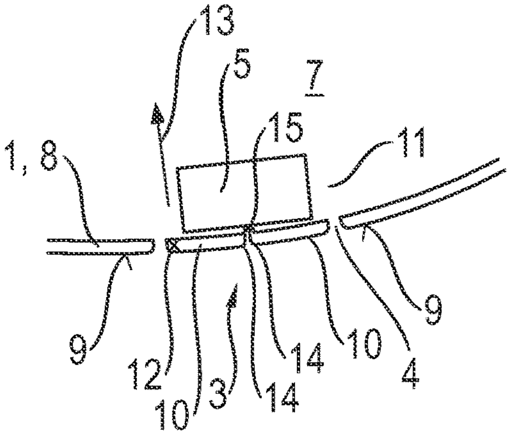
FIG. 3 is a section of the charging flap module of the electric vehicle according to aspects of the invention in the closed position.

The charging flap module 3 according to aspects of the invention is designed as shown in FIGS. 2 and 3, wherein it is illustrated in FIG. 2 in its open position, in which it releases the charging interface 5, and in FIG. 3 in its closed position.

The loading flap module 3 according to aspects of the invention has two flap parts 10, wherein in the open position one of the two flap parts 10 is arranged on the right side of the charging interface 5 and the other of the two flap parts 10 is arranged on the left side of the charging interface 5. The two flap parts 10 are of substantially equal size. However, this is dependent on the charging port 4. It should be noted at this point that the flap parts 10 could also be arranged above and below the charging interface 5.

According to aspects of the invention, the flap parts 10 can be pivoted in a storage space 11 of the body interior 7 which receives the charging interface 5. In the present example embodiment, the storage space 11 is the section of the body interior 7 receiving the charging flap module 3.

For example, the flap parts 10 perform a rotational movement around an axis of rotation 12 from the closed position shown in FIG. 3 to their open position shown in FIG. 2, and then a translational movement along a longitudinal axis 13 extending into the body interior 7. This movement could advantageously be realized with the aid of a slotted guide not shown in more detail.

The two flap parts 10 are designed to overlap at their opposite edges 14. For this purpose, one of the two flap parts 10 has a nose 15, which is covered by the edge 14 of the other of the two flap parts 10 in the closed position.

The charging flap module 3 is designed to be arranged flush with the outer skin 9 in both the closed position and the open position. This has the substantial advantage that even when the charging flap 6 is open, there is no protrusion over the outer skin 9 that could cause the charging flap 6 to get caught or snag and thus damage the charging flap 6 or injure an operator of the electric vehicle 2. In other words, the charging flap module is designed to arrange an outer surface of the flap parts flush with the outer skin, at least in a closed position. The outer surface of the flap parts 10 is understood to be the surface of the flap parts 10 facing away from the body interior 7 in the closed position or the open position.

When the charging flap 6 is in its open position, the charging interface 5 is released and a plug of a charging cable not shown in more detail can be connected to the charging interface 5.

Advantageously, the charging flap module 3 has a drive not shown in more detail, which is in particular an electric drive, for moving the charging flap 6.

The charging flap module 3 further comprises a charging cradle not shown in more detail, comprising the charging interface 5. The charging cradle is designed to be fixed to the body, wherein the charging port 4 is configured in the cradle opening, and can be opened or closed with the aid of a charging flap 6.

In an example embodiment not shown in more detail, the charging flap 6 consists of more than two flap parts 10.

LIST OF REFERENCE NUMBERS

1 Body
2 Electric vehicle
3 Charging flap module
4 Charging port
5 Charging interface
6 Charging flap
7 Body interior
8 Body element
9 Outer skin
10 Flap part
11 Storage space
12 Axis of rotation
13 Longitudinal axis
14 Edge
15 Nose

What is claimed:

1. An electric vehicle having a charging flap module, wherein the electric vehicle comprises:
- a body having (i) a body interior, and (ii) a body element having an outer skin,
- wherein the body element has a charging port, in which the charging flap module is arranged with a charging interface,
- wherein the charging flap module is configured to be fixed to the body,
- wherein the charging flap module includes a charging flap that is configured to be movable between an open position and a closed position for opening and closing the charging port,
- wherein the charging flap comprises at least two movable flap parts, and
- wherein the flap parts are pivotable in a storage space of the body interior receiving the charging interface,
- wherein, in the open position of the charging flap module, the two moveable flap parts are positioned within the storage space and on opposite sides of the charging interface, and, in the closed position of the charging flap module, the two flap parts are positioned flush with the outer skin of the body element.

2. The electric vehicle according to claim 1, wherein the flap parts are configured to be arranged on left and right sides of the charging interface, or above and below the charging interface.

3. The electric vehicle according to claim 1, wherein the flap parts are movable with the aid of a slotted guide.

4. The electric vehicle according to claim 1, wherein the flap parts are configured to overlap.

5. The electric vehicle according to claim 1, wherein the charging flap module for moving the charging flap comprises a drive.

6. The electric vehicle according to claim 5, wherein the drive is an electric drive.

7. The electric vehicle according to claim 1, wherein in the open position of the charging flap module, the flap parts are positioned symmetrically about the charging interface.

8. The electric vehicle according to claim 1, wherein each flap part includes a mating end that is designed to overlap with the mating end of the other flap part in the closed position of the charging flap module.

9. The electric vehicle according to claim 8, wherein the mating end of one of the flap parts includes a protruding nose that is covered by the mating end of the other flap part in the closed position of the charging flap module.

10. The electric vehicle according to claim 8, wherein in the open position of the charging flap module, the mating end of each flap part is positioned substantially flush with the outer skin of the body element.

11. The electric vehicle according to claim 10, wherein an opposing end of each flap part is positioned flush with a rear edge of the charging interface in the open position of the charging flap module.

12. The electric vehicle according to claim 1, wherein in the open position of the charging flap module, an entirety of each flap part is positioned within the storage space.

13. The electric vehicle according to claim 1, wherein in the open position of the charging flap module, the flap parts do not protrude from the outer skin of the body element.

14. The electric vehicle according to claim 1, wherein the flap parts are configured to be arranged on left and right sides of the charging interface.

15. The electric vehicle according to claim 14, wherein each flap part pivots about a vertically oriented axis between the open and closed positions.

16. The electric vehicle according to claim 1, wherein the flap parts are configured to be arranged above and below the charging interface.

* * * * *